(12) United States Patent
Piede

(10) Patent No.: US 7,167,293 B2
(45) Date of Patent: Jan. 23, 2007

(54) SILICON-BASED ELECTRO-OPTIC PHASE MODULATOR WITH REDUCED RESIDUAL AMPLITUDE MODULATION

(75) Inventor: David Piede, Allentown, PA (US)

(73) Assignee: SiOptical, Inc., Allentown, PA (US)

( * ) Notice: Subject to any disclaimer, the term of this patent is extended or adjusted under 35 U.S.C. 154(b) by 0 days.

(21) Appl. No.: 11/342,098

(22) Filed: Jan. 27, 2006

(65) Prior Publication Data

US 2006/0171013 A1    Aug. 3, 2006

Related U.S. Application Data

(60) Provisional application No. 60/652,608, filed on Jan. 28, 2005.

(51) Int. Cl.
*G02F 1/03* (2006.01)
*G02F 1/01* (2006.01)
*G02F 1/035* (2006.01)

(52) U.S. Cl. .............. 359/245; 359/238; 359/276; 359/279; 385/1; 385/2; 385/3

(58) Field of Classification Search ............ 385/1–3, 385/14, 42, 129–131; 398/85; 359/237, 359/238, 245, 276, 279
See application file for complete search history.

(56) References Cited

U.S. PATENT DOCUMENTS

| 6,549,321 B2 | 4/2003 | Noda |
| 6,618,179 B2 | 9/2003 | Kalluri et al. |
| 6,845,198 B2 * | 1/2005 | Montgomery et al. ........ 385/50 |
| 2003/0058504 A1 | 3/2003 | Cho et al. |
| 2004/0218189 A1 | 11/2004 | Izatt et al. |

* cited by examiner

*Primary Examiner*—Loha Ben
*Assistant Examiner*—Jack Dinh

(57) ABSTRACT

An arrangement for removing unwanted amplitude modulation from the output of an electro-optic phase modulator (formed within a silicon-on-insulator (SOI) system) includes resonant filters that are biased on the positive and negative slopes of the response signal. Therefore, as the amplitude response of one filter decreases, the amplitude response of the other filter increases, resulting in balancing the output and essentially eliminating amplitude modulation from the phase-modulated output signal. In one embodiment, ring resonators (formed in the SOI layer) are used to provide the filtering, where as the number of resonators is increased, the performance of the filtering arrangement is improved accordingly.

7 Claims, 4 Drawing Sheets

FREQUENCY SPECTRUM
$\omega_0 = \delta\Phi/\delta t = $ CONSTANT

FREQUENCY SPECTRUM
$\omega_0 = \delta\Phi/\delta t = f(t)$

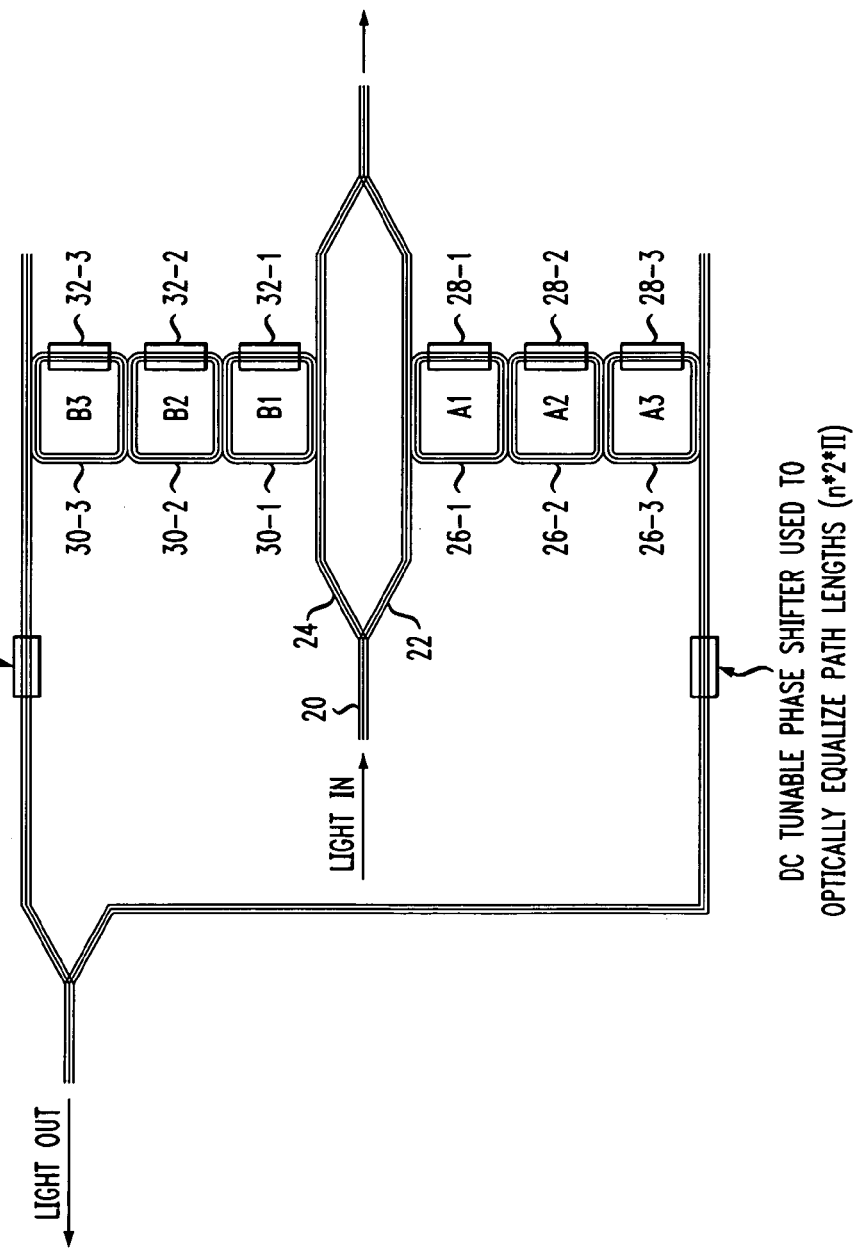

SILICON-BASED ELECTRO-OPTIC PHASE MODULATOR WITH REDUCED RESIDUAL AMPLITUDE MODULATION

CROSS-REFERENCE TO RELATED APPLICATIONS

This application claims the benefit of U.S. Provisional Application No. 60/652,608, filed Jan. 28, 2005.

TECHNICAL FIELD

The present, invention relates to a silicon-based electro-optic phase modulator and, more particularly, to a modulator formed within a silicon-on-insulator (SOI) structure and incorporating tunable ring filters to essentially "cancel" the (unwanted) amplitude modulation present on the modulated optical output signal.

BACKGROUND OF THE INVENTION

Significant advances in the ability to provide optical modulation in a silicon-based platform has been made, as disclosed in U.S. Pat. No. 6,845,198, issued to R. K. Montgomery et al. on Jan. 18, 2005 and assigned to the assignee of the present application. The Montgomery et al. modulator is based on forming a gate region of a first conductivity type to partially overlap a body region of a second conductivity type, with a relatively thin dielectric layer interposed between the contiguous portions of the gate and body regions. The doping in the gate and body regions is controlled to form lightly doped regions above and below the dielectric, thus defining the active region of the device. Advantageously, the optical electric field essentially coincides with the free carrier concentration area in the active device region. The application of a modulation signal thus causes the simultaneous accumulation, depletion or inversion of free carriers on both sides of the dielectric at the same time, resulting in operation at speeds in excess of 10 GHz.

FIG. 1 illustrates one exemplary arrangement of a silicon-based modulator device as disclosed in the Montgomery et al. reference. In this case, a "SISCAP" structure 1 in terms of a doped (i.e., "active") silicon layer 2 (usually polysilicon) is disposed over a doped portion of a relatively thin (sub-micron) surface layer 3 of a silicon-on-insulator (SOI) wafer 4, this thin surface layer 3 often being referred to in the art as the "SOI layer". A thin dielectric layer 5 is located between the doped, active polysilicon layer 2 and the doped SOI layer 3, with the layers disposed so that an overlap is formed, as shown in FIG. 1, to define an active region of the device. As mentioned above, free carriers will accumulate and deplete on either side of dielectric layer 5 as a function of voltages applied to SOI layer 3 (VREF3) and/or polysilicon layer 2 (VREF2). The modulation of the free carrier concentration results in changing the effective refractive index in the active region, thus introducing phase modulation of an optical signal propagating along a waveguide formed along the active region (the waveguide being in the direction perpendicular to the paper).

When constructing such a modulator as a pure frequency modulator (i.e., single sideband), a sawtooth ramp waveform, as shown in FIG. 2, is used to provide the modulating signal. In particular, an input signal is used to linearly change the phase from 0 to $2\pi$, and then nearly instantaneously returning to 0 (and then repeating—modulo $2\pi$). This linear phase shift results in a fixed frequency translation: $\omega_0 = \delta\phi/\delta t$. However, a problem arises with such modulators that are based on the free carrier effect to provide the desired modulation. That is, the optical absorption/attenuation characteristic of the modulator is a function of the total number of free carriers in the optical path. As a result, the application of a signal to modulate the phase of the optical signal will also affect the amplitude of the optical signal. This is problematic in that the unwanted amplitude modulation introduces error in the output signal. FIG. 3 illustrates the presence of this amplitude modulation and the residual AM modulated signal components in the associated frequency spectrum.

Thus, a need remains in the art to remove, as much as possible, the AM modulation present within an SOI-based electro-optic phase modulator.

SUMMARY OF THE INVENTION

The need remaining in the prior art is addressed by the present invention, which relates to a silicon-based electro-optic phase modulator and, more particularly, to a modulator formed within a silicon-on-insulator (SOI) structure and incorporating an integrated filtering arrangement to essentially "cancel" the (unwanted) amplitude modulation present on the modulated optical output signal.

In accordance with the present invention, a filtering arrangement is formed that includes at least a pair of filters, a first filter biased at a near linear region of the amplitude response (positive or negative) and a second filter biased at the opposing near linear region (i.e., negative or positive, respectively). Presuming the first filter is biased along the negative slope region, the amplitude response curve shifts to exhibit more delay and the amplitude is reduced. The second filter, in this case, is biased along the positive slope region so as to increase the amplitude. By controlling the bias points for these two filters, therefore a "zero" amplitude response can be achieved, allowing for pure phase modulation to be provided.

In one embodiment a pair of tunable ring resonator filters may be utilized inasmuch as the processing involved to integrate such a device with a SOI-based electro-optic modulator is well-understood. In particular, a segment of each ring is doped and coupled to an electrode to provide for the desired tuning, where the application of the voltage to the doped area will modifying the effective index (and, therefore, filtered wavelength) for the ring.

In general, a plurality of such filtering elements may be used in combination, where the additional number of elements serves to improve the shape of both the phase and amplitude responses of the modulator by increasing the number of poles and zeroes in the filter response.

Various other embodiments and aspects of the present invention will become apparent during the course of the following discussion and by reference to the accompanying drawings.

BRIEF DESCRIPTION OF THE DRAWINGS

Referring now to the drawings,

FIG. 6 illustrates a variation of the embodiment of FIG. 5, where a plurality of filter elements are used to refine the shaping of both the phase and amplitude responses of an SOI-based electro-optic phase modulator.

DETAILED DESCRIPTION

Figure 1:
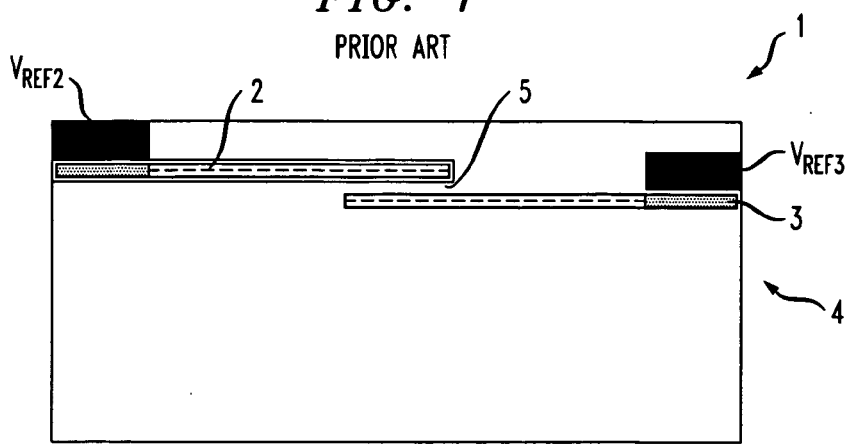
FIG. 1 illustrates, in a simplified cross-sectional view, an exemplary electro-optic phase modulator as formed in a silicon-on-insulator (SOI) structure.
Figure 2:
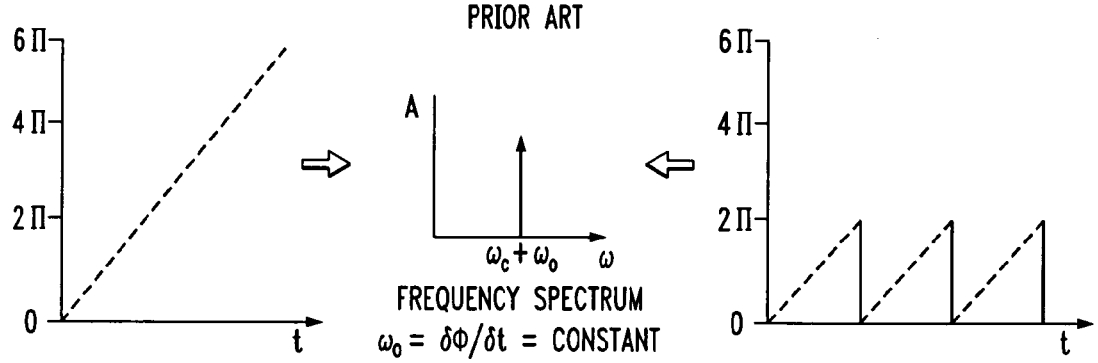
FIG. 2 contains a plot of the ideal phase input and ideal frequency spectrum associated with the modulator of FIG. 1.
Figure 3:
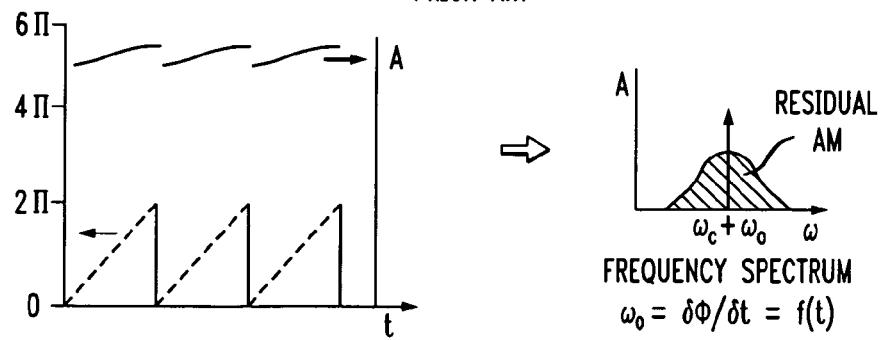
FIG. 3 contains a similar plot of the phase, but also illustrating the amplitude modulated signal component that is present in the modulator of FIG. 1, the frequency spectrum including the residual AM components also being illustrated in FIG. 3.
Figure 4:
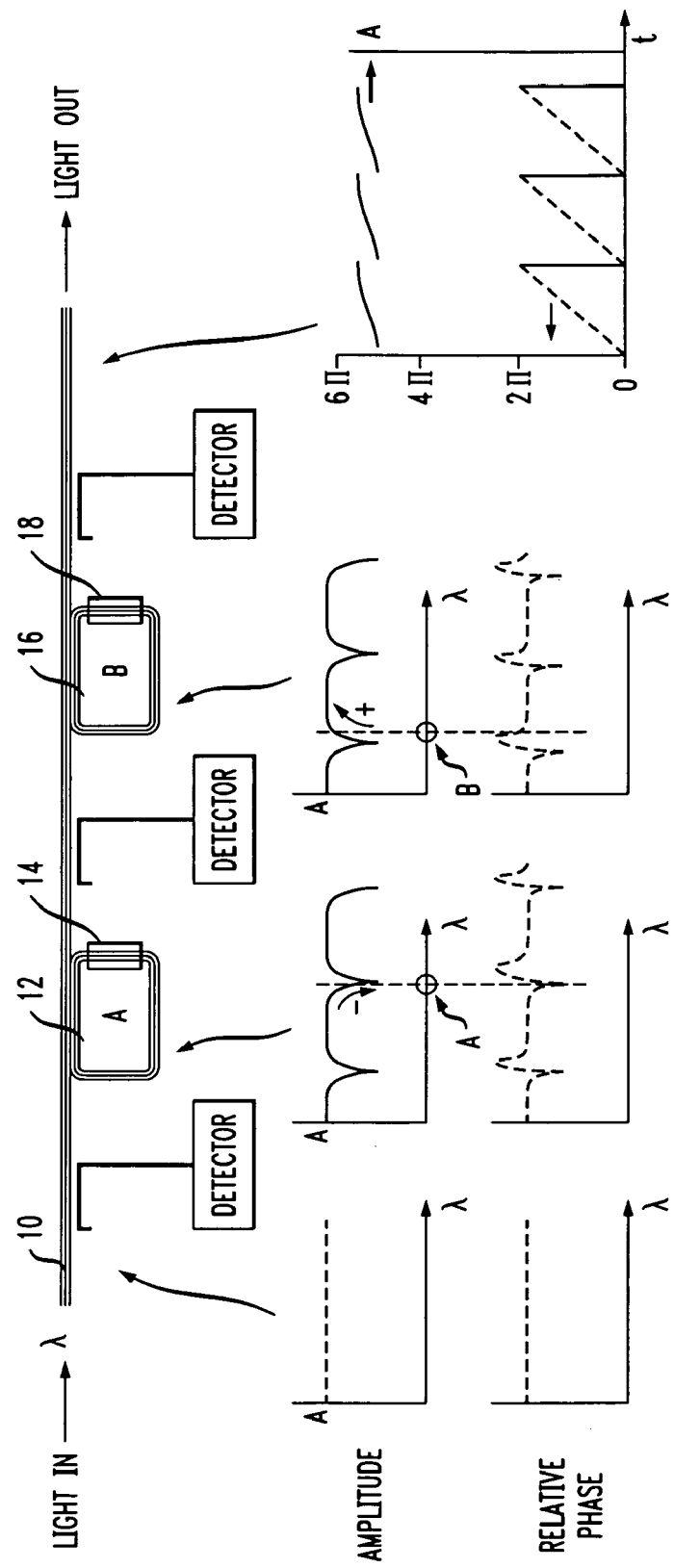
FIG. 4 illustrates, in a simplified view, a first embodiment of an amplitude-correcting arrangement formed in accordance with the present invention to counter the effects of amplitude modulation within an electro-optic phase modulator, where the amplitude and relative phase plots for this embodiment are also shown.

An exemplary arrangement for substantially reducing the presence of amplitude modulation in a phase modulated output signal O from an electro-optic modulator is illustrated in FIG. 4. As shown, optical signal O is propagating along a waveguide 10, where in most cases waveguide 10 will comprise a relatively thin (less than one micron) silicon surface layer of a silicon-on-insulator (SOI) structure. Moreover, the "active region" of waveguide 10 is best confined in the manner described above in association with FIG. 1, which illustrates an "active region" 5 having a relatively narrow width. Such an arrangement is important for single mode applications.

Referring again to FIG. 4, a first optical filtering element 12 (in this case, a ring waveguide) is disposed along waveguide 10 in a manner so as to out-couple a selected portion of the propagating signal. The Q of the ring (and as a result, the phase) defines the selectivity of the filter, where the higher the Q factor, the more selective the filter response. For the purposes of the present invention, a high Q factor is desired. First filtering element 12 (hereinafter referred to as "first ring filter 12" for the sake of discussion) is shown as including a tuning region 14, where tuning region 14 comprises a doped portion of the SOI layer within which first ring filter 12 is formed. By the application of a voltage to tuning region 14, the effective refractive index of that portion of first ring filter 12 is modified. The modification of the effective refractive index results in changing the wavelength of light that will out-couple from waveguide 10. Thus, by adjusting the voltage applied to tuning region 14, the filtered wavelength may be "tuned". In accordance with the teachings of the present invention, first ring filter 12 is tuned so as to out-couple the signal at a predetermined wavelength "A". Referring to the amplitude and phase plots associated with this portion of the arrangement, wavelength "A" is seen to be along the negative (downward) slope of the amplitude response. As the effective refractive index increases, the time delay of first ring filter 12 increases and the filter response curve shifts to the left. Thus, the output phase of the modulated optical output signal shifts to more delay and the amplitude is reduced.

A second ring filter 16 (which, in the most general case may comprise any suitable type of tunable optical filter) is illustrated as disposed along a separate section of waveguide 10, where filter 16 includes a tuning region 18. In accordance with the present invention, the voltage applied to tuning region 18 is controlled so that wavelength "B" filtered by second ring filter 16 will be along the positive (upward) slope of the amplitude response, as shown by the associated amplitude and phase response plots. Again, as the effective refractive index increases, the time delay of second ring filter 16 increases and the filter response curve shifts to the left. In this case, however, as the output phase of the modulated optical output signal shifts to more delay, the amplitude is increased. Therefore, in accordance with the present invention, the increase in amplitude associated with the second filtering element will offset the decrease in amplitude associated with the first filtering element and significantly reduce the residual amplitude modulation present in the output signal.

Figure 5:
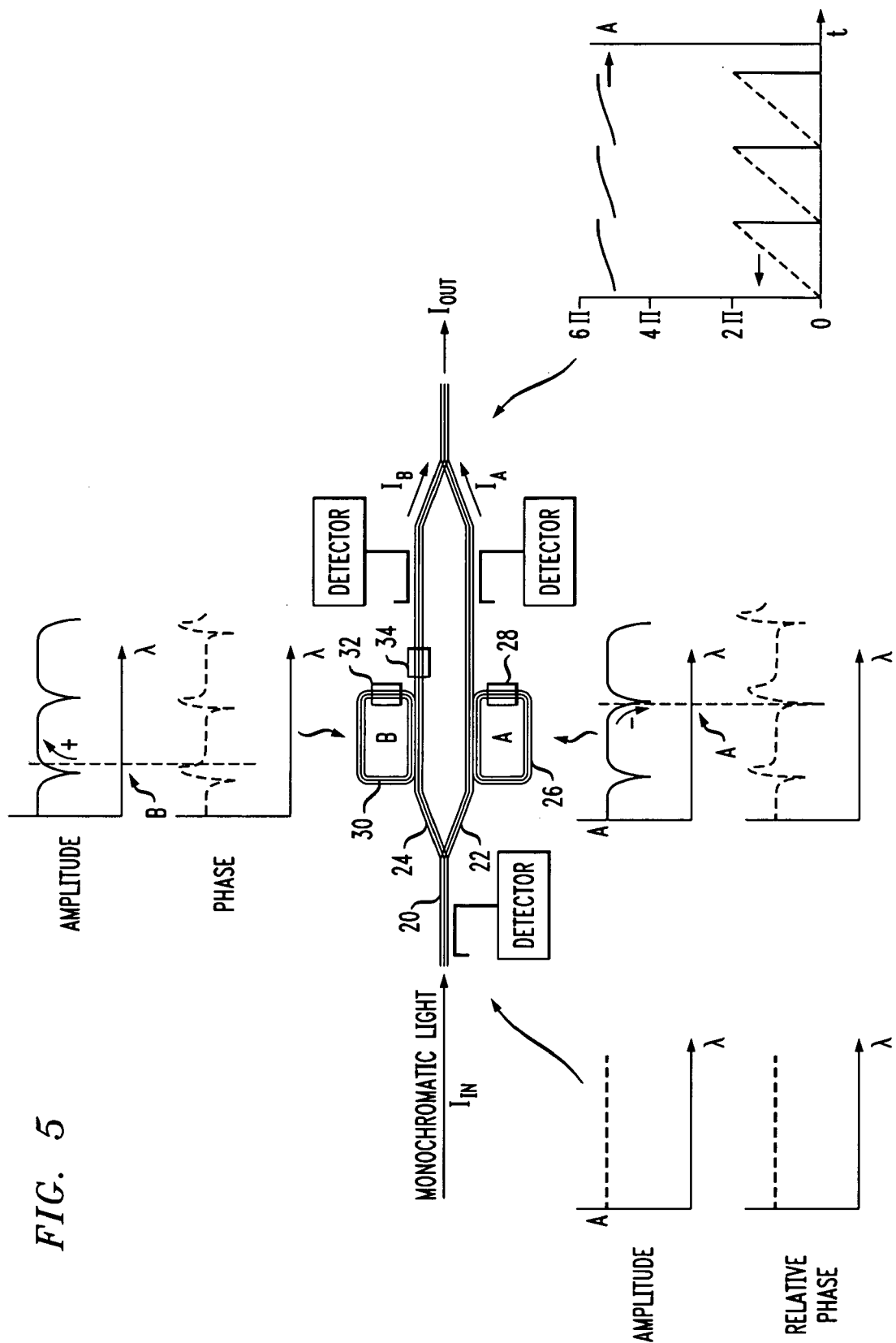
FIG. 5 illustrates an alternative embodiment of the present invention, using a pair of parallel waveguides to generate "amplitude compensation" in accordance with the present invention.

An alternative amplitude compensating arrangement of the present invention is shown in FIG. 5. In this case, an optical splitter formation is used, with each ring filter disposed along a separate one of the split paths. As shown, the optical phase modulated signal is applied as an input along a waveguide 20, where as with the arrangement discussed above, waveguide 20 may be formed within the relatively thin (e.g., sub-micron) surface silicon layer of an SOI structure. Thereafter, waveguide 20 is split into two separate, parallel waveguides 22 and 24. A first tunable filtering element 26 (in this case, a tunable ring filter) is disposed alongside waveguide 22 and functions to out-couple the signal propagating a predetermined wavelength from waveguide 22. Tunable ring filter 26 includes a tuning region 28, where the bias voltage applied to tuning region 28 will determine the specific wavelength that is out-coupled from waveguide 22. As with the arrangement described above, tuning region 28 may comprise a heavily doped portion of the same sub-micron silicon layer used to form waveguide 22, or a doped polysilicon material disposed over that portion of ring filter 26 or, alternatively, a silicide or other metal disposed over a predetermined portion of ring filter 26.

In accordance with the present invention, and similar to the arrangement described above in association with FIG. 4, first ring filter 26 is tuned to filter the signal appearing at wavelength A, shown as along the negative slope of the amplitude response. The application of the appropriate voltage bias to tuning region 28 will allow for this desired wavelength to be selected. A second ring filter 30 is illustrated as disposed alongside waveguide 24, where second ring filter 30 includes a tuning region 32. In this case, the bias applied to tuning region 32 is adjusted until second ring filter 30 removes the wavelength at point "B", associated with rising edge of the amplitude response. The combination of these two signals, therefore, will essentially remove any amplitude response from the modulator output. Specifically, the intensity of the output signal from the arrangement of FIG. 5 can be expressed as follows:

$$I_{out} = \frac{I_A + I_B}{2} + \sqrt{I_A I_B} \cos\phi.$$

Thus, by maintaining $\cos\phi$ at a constant value (near zero), the output intensity will exhibit little amplitude modulation, in accordance with the teachings of the present invention. For example, when a $2\pi$ phase shift is applied to a single phase modulator by the free carrier effect, the output intensity is reduced by 2.5 dB. For the inventive arrangement as shown in FIG. 5, a $2\pi$ phase shift results in the output $I_A$ decreasing in intensity by 20%, while the intensity $I_B$ increases by 20%. However, the total output intensity will change only slightly, since $\cos\phi$ is maintained essentially constant. Thus, assuming a normalized output of unity, $I_{OUT}$ will change to 0.99 (i.e. 1% change) when a 20% change in intensity is applied along waveguides 22 and 24, providing a reduction in amplitude modulation by a factor of twenty. It is to be noted that the waveform applied to each arm is not linear, but the resulting phase shift is linear. Indeed, the change in phase is a direct result of a change in Q=CV, where $\Delta Q/\Delta t$=constant from 0 to $2\pi$.

Inasmuch as the optical signal has been split to propagate along two separate signal paths, a degree of phase shift may occur, since the length of these two paths may not be perfectly equal. Therefore, it is preferred that a separate phase adjustment element 34 be disposed along waveguide 22 and/or waveguide 24 and utilized to compensate for any phase mismatch that may result. That is, the application of a bias voltage to phase adjustment element will introduce the proper time delay required to overcome any phase shift introduced by the arrangement.

As mentioned above, a plurality of separate filtering elements may be used in the arrangement of the present invention to better shape the phase modulation response and remove a larger portion of the unwanted (residual) amplitude modulation. FIG. 6 illustrates a variation of the arrangement of FIG. 5, where in this case, a set of three separate tunable ring filters is stacked alongside each waveguide. That is, a plurality of three separate tunable ring filters 26-1, 26-2 and 26-3 are stacked along a portion of waveguide 22, where each tunable ring filter includes a separate tunable region 28-1, 28-2 and 28-3, with the possibility of applying a difference bias voltage to each region increasing the overall phase/frequency tuning range of the arrangement. A similar stacked arrangement of tunable ring filters 30-1, 30-2 and 30-3 is disposed alongside waveguide 24. A set of tuning regions 32-1, 32-3 and 32-3 are associated with ring filters 30-1, 30-2 and 30-3 in a similar manner to provide an increased wavelength tuning range for the signal propagating along waveguide 24. As mentioned above, increasing the number of rings (i.e., the number of resonances) increases the number of poles and zeroes in the filter response, providing more control over the tunability of the filter.

In the particular embodiment as shown in FIG. 6, there is an increased likelihood of a phase shift occurring between a first output signal propagating along a waveguide 42 disposed along ring filter 26-3 and a second output signal propagating along a waveguide 44 disposed along ring filter 30-3. Therefore, a tunable phase shifter 46 is disposed along waveguide 42, where by controlling the bias applied to tunable phase shifter 46 the optical path lengths of waveguides 42 and 44 can be equalized and phase shift eliminated. Preferably, a second tunable phase shifter 48 is disposed along waveguide 44 to provide for an additional degree of phase shift control.

While the subject matter of the present invention has been shown with various embodiments, it is to be understood that the scope of the invention is limited only by the claims appended hereto.

What is claimed is:

1. A filtering arrangement for reducing amplitude modulation in a silicon-based electro-optic phase modulator output, the filtering arrangement formed in a silicon-on-insulator (SOI) structure including a sub-micron thick silicon surface layer (SOI layer) and comprising:
    an optical waveguiding structure formed within the SOI layer for supporting the propagation of an optical output signal from an associated electro-optic phase modulator;
    a first optical filter, coupled to the optical waveguiding structure, and formed to out-couple a predetermined first wavelength along a rising edge of the filter characteristic curve; and
    a second optical filter, coupled to the optical waveguiding structure, and formed to out-couple a predetermined second wavelength along a falling edge of the filter characteristic curve so as to reduce amplitude modulated components from the propagating optical output signal.

2. A filtering arrangement as defined in claim 1 wherein the optical waveguiding structure comprises a single optical waveguide formed within the SOI layer of the SOI structure.

3. A filtering arrangement as defined in claim 1 wherein the optical waveguiding structure comprises an optical splitter/combiner geometry including a first waveguiding arm and a second waveguiding arm disposed in parallel between an input waveguiding section and an output waveguiding section, where the first optical filter is disposed alongside the first waveguiding arm and the second optical filter is disposed alongside the second waveguiding arm.

4. A filtering arrangement as defined in claim 3 wherein the optical splitter/combiner further comprises an optical phase adjustment element disposed along either one or both of the first waveguiding arm and the second waveguiding arm, the optical phase adjustment element for reducing phase differences between the signals propagating thereal-ong.

5. A filtering arrangement as defined in claim 1 wherein the first and second optical filters comprise optical ring resonators, formed as ring waveguides within the SOI layer of the SOI structure.

6. A filtering arrangement as defined in claim 5 wherein the optical ring resonators include a highly doped region to provide for tuning of the filtered wavelength value.

7. A filtering arrangement as defined in claim 1 wherein the first optical filter comprises a first plurality of separate optical filtering elements and the second optical filter comprises a second plurality of separate optical filtering elements where each filtering element is configured to out-couple a difference wavelength and the resonance of the filtering arrangement response increases with an increasing number of separate filtering elements.

* * * * *